(12) United States Patent
Li (10) Patent No.: US 10,809,720 B2
(45) Date of Patent: Oct. 20, 2020

(54) BI-DIRECTIONAL AUTONOMOUS VEHICLE

(71) Applicant: Chian Chiu Li, Fremont, CA (US)

(72) Inventor: Chian Chiu Li, Fremont, CA (US)

( * ) Notice: Subject to any disclaimer, the term of this patent is extended or adjusted under 35 U.S.C. 154(b) by 206 days.

(21) Appl. No.: 15/813,133

(22) Filed: Nov. 14, 2017

(65) Prior Publication Data

US 2019/0146494 A1 May 16, 2019

(51) Int. Cl.
*G05D 1/00* (2006.01)
*G05D 1/02* (2020.01)
*B62D 63/00* (2006.01)

(52) U.S. Cl.
CPC .......... *G05D 1/0088* (2013.01); *B62D 63/00* (2013.01); *G05D 1/021* (2013.01)

(58) Field of Classification Search
CPC ............... G05D 1/0088; G05D 1/021; B60W 2040/0881; B60R 21/01; B60R 21/015; B60R 21/01554; B60N 2002/0272; B60N 2/32; B60N 2/90; B60Q 2300/22
See application file for complete search history.

(56) References Cited

U.S. PATENT DOCUMENTS

| | | | | |
|---|---|---|---|---|
| 2010/0300796 | A1* | 12/2010 | Ryan | B60K 26/00 180/329 |
| 2015/0203111 | A1* | 7/2015 | Bonnet | B62D 15/027 701/25 |
| 2016/0378112 | A1* | 12/2016 | Ljubuncic | B60W 30/16 701/45 |

* cited by examiner

*Primary Examiner* — Jerrah Edwards (57) ABSTRACT

System and method for bi-directional autonomous vehicle. In one aspect, a vehicle's forward direction and front end are determined by a user's command or sitting orientation. In another aspect, a vehicle's forward direction and front end are determined by a user's records or prearrangements. Moreover, a vehicle's shape is adjustable according to front end selection.

17 Claims, 5 Drawing Sheets

BI-DIRECTIONAL AUTONOMOUS VEHICLE

FEDERALLY SPONSORED RESEARCH

Not applicable

SEQUENCE LISTING OR PROGRAM

Not applicable

BACKGROUND

Field of Invention

This invention relates to the field of autonomous vehicle, more particularly to selection of the forward direction and front end of a bi-directional autonomous vehicle.

Description of Prior Art

Autonomous vehicles represent a great advance in the transportation industry. Autonomous driving is expected to reduce traffic fatalities and crashes caused by driver errors, provide increased mobility for people who lack access to automobiles, reduce energy consumption and pollution, and cut costs associated with congestion. In general, an autonomous vehicle (also known as a driverless or self-driving vehicle) is a vehicle capable of sensing and navigating around the vehicle's surroundings and travelling autonomously to a destination without user input.

In driver-operated vehicles except buses and trams, seats are arranged facing one direction, the forward direction. In autonomous vehicles, however, seats may be arranged facing both forward and backward directions. An autonomous vehicle may be made bi-directional without dealing with transmission and steering difficulties which a conventional vehicle has to overcome. A bi-directional vehicle may use either end as its front and drive for a long distance in opposite directions respectively. When a user takes a seat in a bi-directional vehicle, the user may not know which direction the vehicle would go along and may end up sitting there facing the backward direction. Then the user may want to change seat in a hassle, which may cause inconvenience and anxiety.

Therefore, there exists a need for matching a bi-directional vehicle's forward direction with a user's sitting orientation or a user's selection.

As used herein, word "vehicle" may mean any form of motorized transportation. Examples of vehicle may include automobile, drone, flying car, aircraft, and ship. For convenience of description, it may be arranged that "Service Center" as used herein may mean a center or remote facility as a business entity or a server which is operated at Service Center. "Check in" as used herein may mean a user logs in a system at a vehicle using info obtained from a reservation or using other suitable info. After a check-in process, a user may be allowed to interact with a vehicle further. "Autonomous mode" as used herein may mean a driverless driving state. When a vehicle is in autonomous mode, it navigates and travels by itself without the need of user input.

OBJECTS AND ADVANTAGES

Accordingly, several main objects and advantages of the present invention are:

a). to provide an improved system and method for a bi-directional autonomous vehicle;

b). to provide such a system and method which determine a forward direction and front end based on a user's command;

c). to provide such a system and method which determine a forward direction and front end based on a user's sitting orientation;

d). to provide such a system and method which determine a forward direction and front end based on a user's records or prearrangements; and e). to provide such a system and method which change a vehicle's shape to match a forward direction.

Further objects and advantages will become apparent from a consideration of the drawings and ensuing description.

SUMMARY

In accordance with the present invention, a bi-directional autonomous vehicle may select a proper forward direction and front end to improve a user's riding experience. The vehicle may take a user's command and choose a forward direction and front end based on the command. The vehicle may detect a user's sitting orientation and choose a forward direction and front end based on the sitting orientation. The vehicle may also decide a forward direction and front end based on a user's records or prearrangements. Furthermore, a vehicle's exterior shape may be adjusted when its front and rear ends are switched.

DRAWING FIGURES

FIGS. 1-A and 1-B are exemplary diagrams describing bi-directional autonomous vehicles respectively in accordance with the present invention.

FIGS. 2-A, 2-B, 2-C, and 2-D are exemplary diagrams depicting a bi-directional vehicle with an adjustable shape in accordance with the present invention.

FIGS. 4-A, 4-B, and 4-C are exemplary diagrams illustrating a vehicle having a movable seat in accordance with the present invention.

| REFERENCE NUMERALS IN DRAWINGS | | | |
|---|---|---|---|
| 10 | Processor | 12 | Computer Readable Medium |
| 14 | Communication Network | 16 | Server |
| 18 | Bi-Directional Vehicle | 20 | Processing Module |
| 22 | Database | 24 | Control System |
| 26 | Speed Control Module | 28 | Steering Module |
| 30 | Braking Module | 32 | Bi-Directional Vehicle |
| 34 | Driving System | 36 | Bi-Directional Vehicle |
| 38 | Bi-Directional Vehicle | 40 | Bi-Directional Vehicle |
| 42 | Object | 44 | Object |
| 46 | Flexible Sheet | 48 | Seat |
| 50 | Seat | | |
| 100-128 | are exemplary steps. | | |

DETAILED DESCRIPTION

The following exemplary embodiments are provided for complete disclosure of the present invention and to fully inform the scope of the present invention to those skilled in the art, and the present invention is not limited to the schematic embodiments disclosed, but can be implemented in various types.

Figure 1:
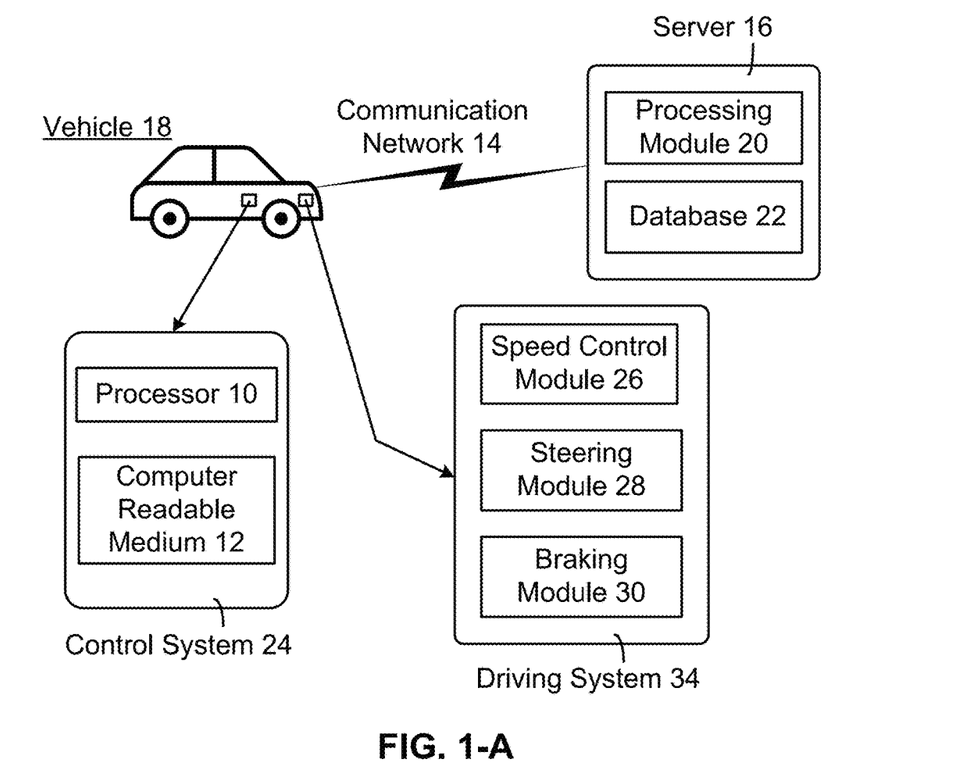

FIG. 1-A is an exemplary block diagram of one embodiment according to the present invention. A vehicle 18 and server 16 are connected via a wireless communication network 14. Assume that vehicle 18 is a bi-directional autonomous automobile for the purpose of illustrating embodiments. Vehicle 18 may include a vehicle control system 24 and driving system 34 responsible for vehicle navigation and driving respectively. System 24 may include a processor 10 and computer readable medium 12. Processor 10 may mean one or more processor chips or systems. Medium 12 may be the main part of a vehicle storage system and may include a memory hierarchy built by one or more memory chips or storage components like RAM, ROM, FLASH, or other suitable storage modules. Processor 10 may run programs or sets of executable instructions stored in medium 12 for performing various functions and tasks, e.g., receiving and processing data collected from sensors, retrieving map data from medium 12, sending driving signals to system 34, executing other applications, etc. System 24 may also include input, output, and communication components, which may be individual modules or integrated with processor 10.

In addition, system 24 may have a display (not shown in the figure for brevity reason) and a graphical user interface (GUI). The display may have a liquid crystal display (LCD) screen or light emitting diode (LED) screen and may be arranged sensitive to touches, i.e., sensitive to haptic and/or tactile contact with a user. The display may serve as the main display of system 24 and the interface may be used to show vehicle status, driving conditions, current driving route, and certain options. A user may use the interface to search and retrieve information, view surrounding area maps, enter input or instructions, interact with system 24, and so on.

Driving system 34 comprises modules 26, 28, and 30 for implementing driving maneuvers which are determined by system 24. Speed control module 26 is configured to regulate the driving force or speed of vehicle 18. For a gasoline or diesel powered vehicle with an internal combustion engine, module 26 contains a throttling system which controls the speed of the engine which in turn determines the speed of the vehicle via a transmission system. For an electric vehicle, module 26 may contain a driver system to control the speed of an electric motor. The motor speed determines the vehicle speed. Steering module 28 is arranged to control the steering torque which then adjusts the heading of the vehicle. Braking module 30 is designed to use a hydraulic brake system to decelerate the vehicle.

In practice, an electric autonomous vehicle may be favored for bi-directional driving. First, an electric motor can rotate in opposite directions and needs just one gear. An internal combustion engine, however, only rotates in one direction, and thus needs both forward gear and reverse gear. For instance, a conventional gasoline powered vehicle may have multiple forward gears and a single reverse gear. The single reverse gear limits the vehicle to low backward speeds. Second, a bi-directional automobile may be steered using front wheels when driving along one direction and using rear wheels when driving along the opposite direction. It may become an issue since many users may find it hard to control when rear wheels are used to maneuver a vehicle. The control difficulties may be resolved by fine-tuned programs in autonomous mode. Therefore, an electric autonomous vehicle may be preferred when bi-directional driving is implemented.

Many autonomous vehicles are likely owned, serviced, and managed by business entities. Assume that vehicle 18 is administered by Service Center and server 16 is installed at Service Center. The word "server" means a system or systems which may have similar functions and capacities as one or more servers. Main components of a server may include one or more processors, which control and process data and information by executing software, logic, code, or carrying out any other suitable functions. Server 16 may be divided exemplarily into two blocks, represented by a processing module 20 and a database 22. Processing module 20 may include processing and communication functions. Database 22 may store vehicle service records and information, map data and geographic info of certain areas, user account information, user transaction records, user activity records, etc. The database may include a cluster of aforementioned and other memory chips and/or storage modules.

Vehicle 18 may include multiple sensors (Not shown in the figure) to detect the external environment that surrounds the vehicle and users inside. The sensors may include multiple cameras, a radar system, a light detection and ranging (LIDAR) system, a GPS device, a speed sensor, an accelerometer, an electronic compass, a suspension sensor, etc. Some cameras may be located on or exposed to the exterior of the vehicle. These cameras may be used to take images and videos of the surroundings to detect and recognize road signs, road marks, pedestrians, obstacles, other vehicles, buildings, land marks, etc. Some other cameras may be arranged inside the vehicle to sense a user or occupant, like whether a user has settled down after getting in the vehicle. The radar and LIDAR systems may detect the surroundings and create a three-dimensional image which is advantageous over two-dimensional images generated by cameras. Three-dimensional images are especially useful to sense and recognize pedestrians and other vehicles. The GPS device provides the present location of vehicle 18. GPS data may be combined with info acquired by cameras, radar and LIDAR to obtain a precise location of the vehicle.

Furthermore, vehicle 18 may have a voice recognition system to receive and interpret a user's voice command or vocal input. The system may employ multiple microphones which may be configured at several places inside the vehicle. Arrangement of the microphones may be optimized for efficient collection of voice input. Vehicle 18 may also have a gesture detection sensor to sense a user's gesture instructions. In addition, vehicle 18 may contain a facial recognition system which may recognize the identity or certain features of a user. Both the gesture sensor and the facial recognition system rely on pictures and/or videos captured by cameras installed inside the vehicle. It is noted that voice, gesture, and facial recognition technologies are all mature nowadays.

FIG. 1-B shows an exemplary bi-directional vehicle 32 according to the present invention. Vehicle 32 may look like a conventional unidirectional vehicle, which has a familiar front end on the right-hand side and a familiar rear end on the left-hand side. Since the vehicle is bi-directional, it may be driven in opposite directions respectively, i.e., to the right or the left in the figure. Accordingly, vehicle 32 may have two sets of lights prepared for the two directions. For instance, when going to the right, highlights 1, brake lights 1, and a third brake light 1 are activated. The third brake light is also called center high mount stop lamp. When vehicle 32 drives to the left direction, the left side become its front end and highlights 2, brake lights 2, and a third brake light 2 are in use. Not shown in the figure are additional sensors for observing surroundings comparing to a unidirectional vehicle. The additional sensors may be required to assist the reverse driving. Furthermore, an improved radar and LIDAR system may be used to accommodate the new needs when heading backwards.

Figure 2:
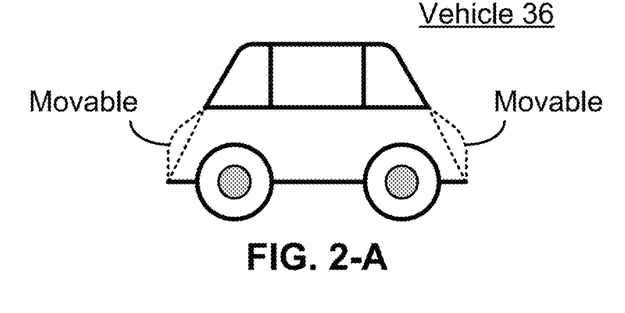

FIGS. 2-A, 2-B, 2-C, and 2-D are exemplary diagrams showing a bi-directional vehicle 36 according to the present invention. For a unidirectional vehicle, its front side looks like a front end and its back looks like a rear end. Since a bi-directional vehicle moves in either direction, there are two options if the exterior shape is fixed: A vehicle may have a symmetrical shape or asymmetrical shape along a front-rear direction. In the former case, a vehicle's front and rear ends may look similar or identical. In the latter case, a vehicle may appear in forward motion along one direction and in backward motion along the other direction. If a bi-directional vehicle always appears to be driven in a forward direction, the shape of the vehicle would be changeable or switchable, that is, the vehicle's exterior shape may be changed to fit a driving direction. For instance, vehicle 36 has an adjustable shape at both ends.

In FIG. 2-A, the adjustable parts are depicted by dotted lines. The surface may be switched between a curved surface and a flat surface. It is well known that certain object may have a changeable or deformable shape. Many mechanisms may exist. FIG. 2-B describes a schematic method to make the change. Assume that an object 42 has a flexible sheet 46 which forms a flexible surface. An object 44 has a rigid curved surface which bulges outwards. At step 1, objects 42 and 44 are not in contact. Sheet 46 remains flat. At step 2, object 44 is pushed inside object 42 and the rigid curved surface presses against sheet 46 in an outward direction. Sheet 46 becomes curved and bulges outwards. The dotted line reflects the original position of sheet 46. The schematic method described at steps 1 and 2 may be used to make a surface switch between a flat and a curved state. When the method is applied at vehicle 36, the vehicle may have an adjustable end, which may be changed from a curved shape to a flat shape, or vice versa.

In FIG. 2-C, assume that vehicle 36 drives towards the left direction, which makes the left direction the forward direction. Hence, the left side of vehicle 36 becomes the front end. At a designing stage of vehicle 36, it may be decided that the front end features a curved surface, while the rear end has a flat surface. A vehicle manufacturer or Service Center may determine which shape represents the front end and which shape is for the rear end. On the other hand, a user may make selections too. For instance, a user may choose a shape for the front and another for the back during a check-in process or in the middle of a journey if it is allowed. After it is known the left is the front end, a control system of the vehicle may send a signal to an actuator which generates a bulged surface at the left side. Meanwhile, another actuator may create a flat surface at the right side. After the change, vehicle 36 looks like driving to the left direction in a forward motion.

When vehicle 36 drives to the right direction at the next moment, the control system may adjust both ends' exterior shape. Results after the adjustment are shown in FIG. 2-D. The right side appears bulged and the left side becomes flat. Thus, whether vehicle 36 drives to the left or to the right, it appears in a forward motion all the time. Therefore, a bi-directional vehicle may change shape according to the needs and achieve improved user experience.

Like a conventional automobile, an autonomous vehicle designed for personal use may have two rows of seats due to a small interior space. Since there is no driver and no steering wheel, the front seats may face backward and the two rows may be in a face-to-face configuration, as shown exemplarily in FIG. 3. In the figure, an exemplary bi-directional vehicle 38 takes a symmetric shape along a front-rear direction. When it moves, its front is considered as the front end. For instance, if the vehicle drives to the left direction, the left side may be viewed as the front end and the right side as the rear end. If the vehicle moves to the right, the right side becomes the front end. The vehicle may also have an asymmetric shape, as the shape factor doesn't affect discussions below.

Inside an autonomous vehicle, face-to-face seats may be identical. On the other hand, the seats may also be designed different to provide multiple options to a user. The seats may have different styles, structures, finish, or functions. For instance, both velvet and leather seats may be arranged in a vehicle. Some seats may have massaging functions and some may provide virtual reality (VR) or augmented reality (AR) goggles. Whether the seats are identical or not, a user may have a preference and may take a seat of choice after getting in a vehicle. For instance in FIG. 3, there are seats 48 and 50 inside vehicle 38 in an exemplary illustration. Seat 48 may look like a regular car seat, while seat 50 may resemble a tilted recliner. Assume that a user takes seat 48 and sits there. Sensors inside vehicle 38 may keep monitoring the user. Measurement results may be sent to the vehicle's control system and used to ascertain whether the user has settled down.

Figure 3:
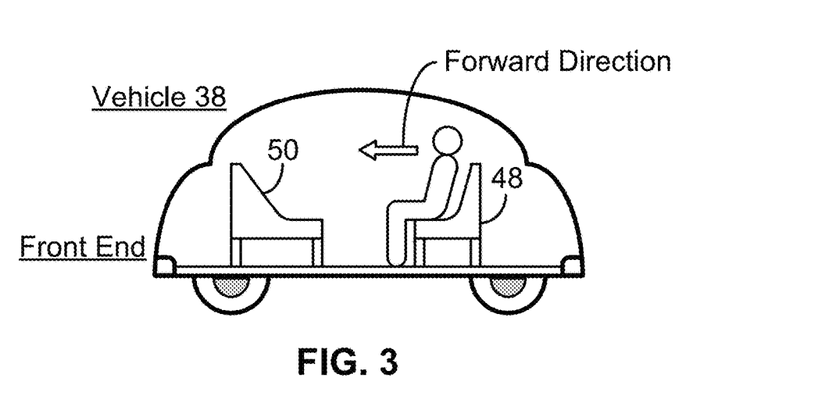
FIG. 3 is an exemplary illustration which describes a method to determine a vehicle's forward direction and front end based on a user's sitting orientation in accordance with the present invention.

Assume that destination info is known. After the control system determines via algorithm that the user has settled down on seat 48, it may decide which direction it should drive along. As many users may favor facing the driving direction, the control system may be configured to decide the left direction should be the forward direction. So the left side becomes the front end and the right side becomes the rear end. In summary, a bi-directional vehicle may determine which direction should be the forward direction based upon a user's sitting orientation. When measurement data indicates a user faces a direction, the direction may be chosen as the forward direction. Thus a user may take any seat in a bi-directional vehicle and always face a forward direction.

Figure 4:
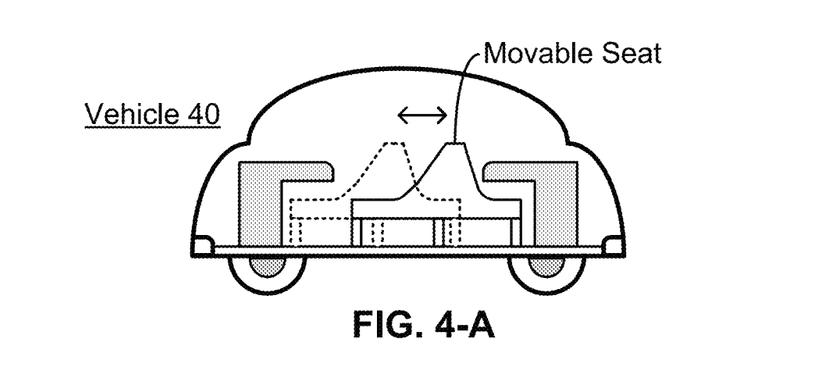

FIGS. 4-A, 4-B, and 4-C show an exemplary bi-directional vehicle 40 with a movable seat. Vehicle 40 may have a symmetric shape as in the figure or an asymmetric shape. As shown in FIG. 4-A, a movable seat is configured inside the vehicle. The solid lines and dotted lines represent the seat at two places. The seat has two sides facing opposite directions. The two sides may have identical or different styles, structures, finish, or functions. Back-to-back seats may be desirable when it is hard to accommodate a face-to-face scenario in a limited vehicle space.

In FIG. 4-B, a user moves the seat to the right and sits on the left side facing the left direction. In FIG. 4-C, the user moves the seat to the left and settles down on the right side facing the right direction. A control system of the vehicle may monitor the user continuously after the user gets inside. Once it is determined that the user chooses a place to sit, a direction the user faces is finalized. Then the control system may choose the direction, which the user faces, as the forward driving direction and the vehicle end, which the user faces, becomes the front end.

Figure 5:
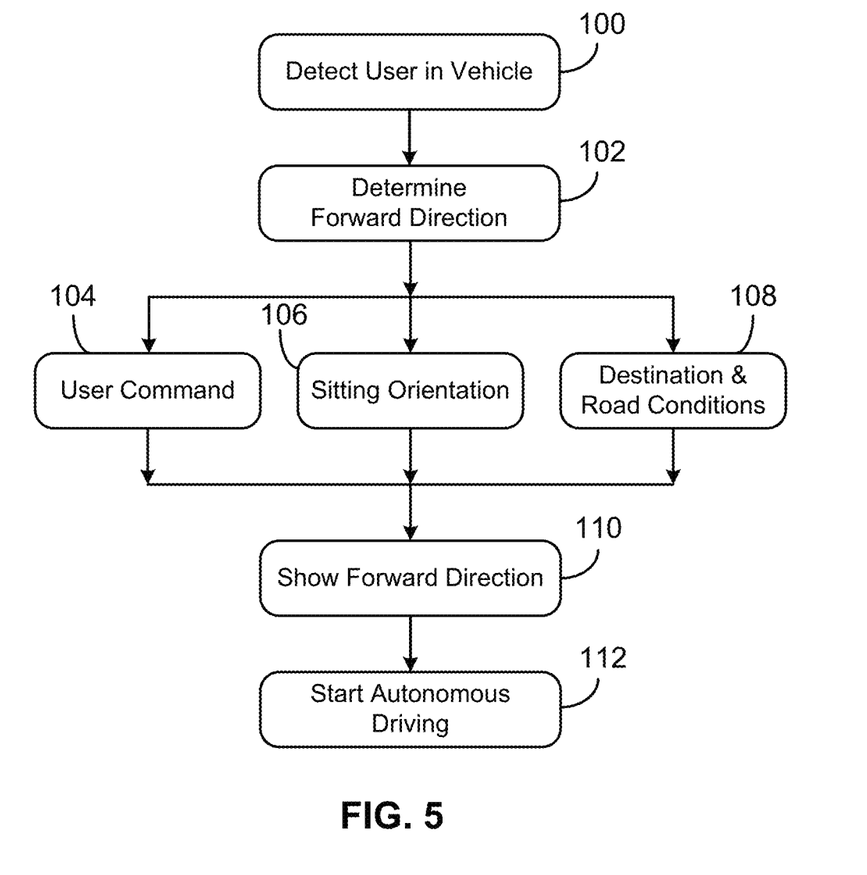
FIG. 5 is an exemplary flow diagram describing methods to determine a vehicle's forward direction and front end in accordance with the present invention.

Besides a user's sitting orientation, a bi-directional vehicle's forward direction may also be determined by other factors. FIG. 5 shows an exemplary flow diagram which describes an embodiment related to selection of forward direction and front end according to the present invention. Assume that a user enters a bi-directional vehicle at step 100, which is detected by the vehicle's control system. Next the control system starts monitoring the user using sensors such as cameras and microphones installed at the vehicle. At step 102, the user may check in at the vehicle system and the control system is arranged to decide which direction should be the forward direction for the upcoming journey. There are several methods.

At step 104, the user may say a word or sentence as a voice command with or without a gesture. The user may also make gestures without saying anything. For instance, the user may say "Go that way" and then use hand and fingers to point to a direction. The user may say "Go forward" or "Go ahead" too, meaning to go along a direction the user faces. The user may also gesture without saying a word, like using a finger to point at a direction. The user's voice input may be sensed by a microphone and interpreted by a voice recognition system. The user's gesture may be recorded as pictures and videos by one or more cameras and analyzed by a gesture recognition system. The interpreted voice and gesture messages may be sent to the control system. The control system may analyze the messages to identify a direction which the user selects. Then that direction is chosen as the forward direction and the front side of the vehicle along the selected direction becomes the front end. Alternatively, the user may also say "Front", "Forward", or "Front end" while pointing to one side of the vehicle.

At step 106, a sitting orientation of the user is employed to decide a forward direction and front end. As aforementioned, many users may prefer facing a forward direction. Thus if it is detected that a user or multiple users all face one direction after taking a seat in a vehicle, the direction may be chosen as the forward direction. It is noted that a user may select one end as the front end regardless of road or parking lot conditions. For instance, assume a vehicle is parked with one end against a wall. A user may still choose the end as front end. Then the vehicle may drive out of the parking spot first and then change driving direction to make the selected end as the front end.

When user instructions are not detected and there are users sitting face to face or facing opposite directions, the control system may determine a forward direction based upon destination and road conditions as shown at step 108. For instance, if a destination is located in the left direction, that direction may be selected as the forward direction. If the vehicle is parked at a one-way street, the allowable driving direction may be chosen as the forward direction. When a vehicle is at a parking spot with one end over against a barrier, the side facing the barrier may be considered as the rear end and the other side as the front end.

After a forward direction is determined, the control system may display a sign or symbol to show a user at step 110. The sign or symbol, such as a lighted arrow, may indicate which direction is the forward direction and assure the user before the vehicle moves. At step 112, the control system starts navigating the vehicle and begins a journey in autonomous mode.

Figure 6:
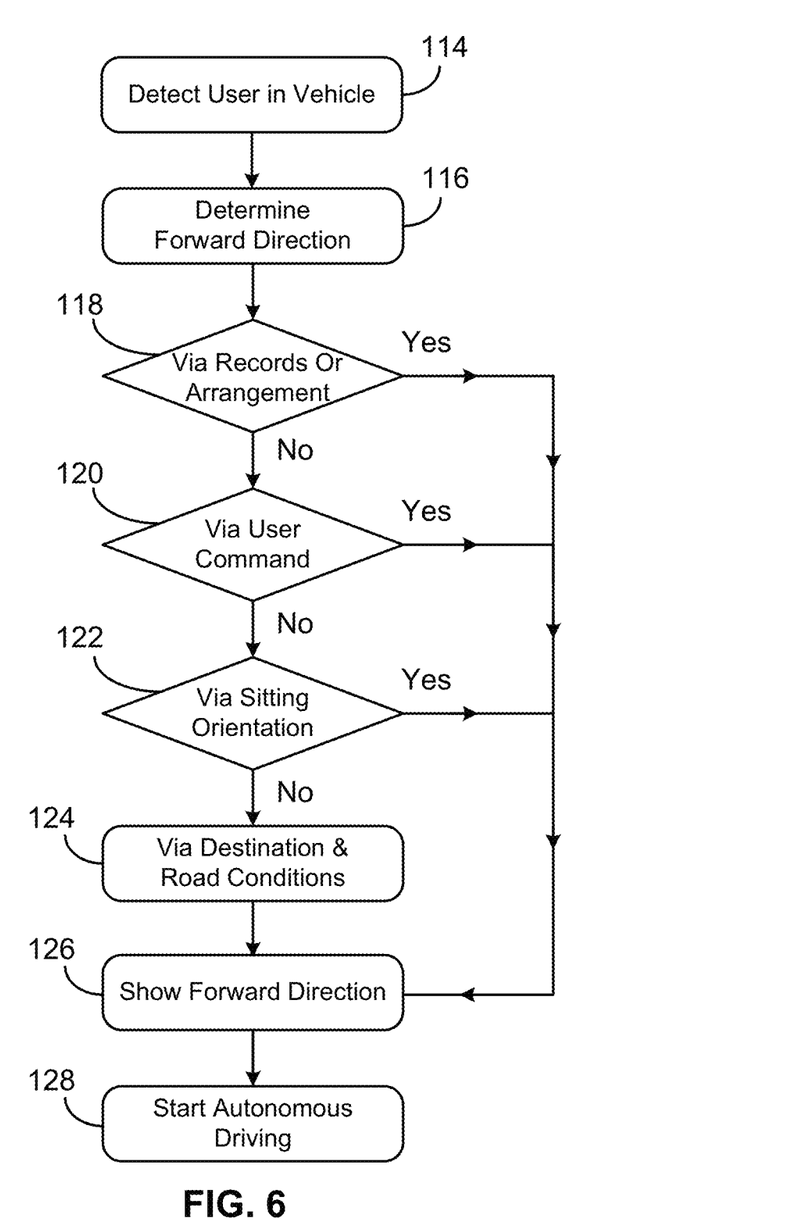
FIG. 6 is an exemplary flow diagram illustrating a process to decide a vehicle's forward direction and front end in accordance with the present invention.

FIG. 6 shows another exemplary flow diagram which describes methods to determine a forward direction according to the present invention. At step 114, a user enters a bi-directional vehicle and then checks in at the vehicle system. Meanwhile, the vehicle's control system starts monitoring the user to decide which direction should be the forward direction and which side of the vehicle should be the front end for a journey at step 116. After the check-in process is complete, the user's identity info is sent to Service Center by the control system. Next the center retrieves user information and transmits it to the control system. The user information may include past riding preferences and options and prearrangements submitted in a reservation process. Then the control system may decide a forward direction and front end based on the user information at step 118. For instance, a user's records may show that the user always preferred one end as the front end or the user has selected a seat in a reservation and prefers facing a forward direction. Thus the control system may utilize past records or reservation data received from Service Center to determine the forward direction and front end at step 118. After that, the process proceeds with step 126.

Assume that the control system can't decide which direction should be the forward direction based on information obtained from Service Center. At step 120, the system may detect whether the user gives any input. The system may monitor the user and collect any voice or gesture command after it is generated. If sensors at the vehicle detect that the user gives a voice or gesture command, the control system may use it to select a forward direction and front end. Then the process may proceed with step 126. It is noted that a user's voice or gesture command may overwrite a decision made at step 118. For instance, assume a user preselected a side as the front end during reservation. If the user points to the other side and says "Front", the control system may follows instructions made on site and discard the prearrangement.

If the user doesn't give any instructions, the control system may determine the forward direction and front end based on the user's sitting orientation at step 122. As discussed in the above, since many users prefer facing a forward direction, the control system may detect which direction the user faces after taking a seat and then make that direction as the forward direction. Next the process may proceed with step 126.

If the control system can't decide the forward direction and front end at step 122, which may happen when there are multiple users in a vehicle and the users take face-to-face seats, the system may utilize destination info, parking conditions, and/or road conditions to do it at step 124. For instance, if a vehicle has one end facing a destination, the end may be chosen as the front end. If a vehicle sits at a parking space with one end facing a curb, the other end may be selected as the front end, which enables the vehicle to head for a destination without stopping and then changing driving direction. It makes a journey smoother and more efficient.

At step 126, one or more signs showing the selected forward direction may be displayed inside the vehicle. One or more signs may also be displayed on the exterior of the vehicle to show its driving direction to pedestrians around it and users in other vehicles. The signs may comprise a LED system which may remain invisible and become a conspicuous arrow or moving arrows only after being lighted. Finally at step 128, the control system may start driving the vehicle autonomously.

CONCLUSION, RAMIFICATIONS, AND SCOPE

Thus it can be seen that systems and methods are introduced to select a forward direction and front end properly, which may improve user experience of bi-directional autonomous vehicles.

The improved systems and methods have the following main features and advantages:

(1) A vehicle's forward direction and front end may be determined by a user's voice and gesture instructions;
(2) A vehicle's forward direction and front end may be determined by a user's past records or prearrangements;
(3) A vehicle's forward direction and front end may be determined by a user's sitting orientation;
(4) A vehicle's forward direction and front end may be determined by destination info and/or road conditions; and
(5) A vehicle's exterior shape may be adjustable according to front end selection.

Although the description above contains many specificities, these should not be construed as limiting the scope of the invention but as merely providing illustrations of some of the presently preferred embodiments. Numerous modifications will be obvious to those skilled in the art.

Ramifications:

In FIGS. 2-A to 2-D, vehicle 36 may also have a symmetric shape. For instance, the control system may send signals to the actuators such that the vehicle's two ends may have the same shape, i.e., sheets 46 may be flat or bulged at both ends. In other words, four options may be provided to a user: The vehicle may have a bulged surface at the left side and flat surface at the right side, flat surface at the left side and bulged surface at the right side, or bulged or flat surface at both sides. As discussed, it may be designed that a bulged surface represents a front end. Alternatively, an option may be arranged such that a user may choose the shape of a front end.

A control system of a bi-directional vehicle may also take an order to change front end during a journey. Cameras and microphones may be arranged to monitor a user inside a vehicle continuously. Once a user says "Switch front end" in the middle of a trip, for example, the command may be received by microphones and translated by a voice recognition system. Then the message is sent to the control system, which in turn calculates a route segment. The vehicle may take the route segment, stop at an appropriate place, and then drive with the opposite side as the front end. Thus, front and rear ends may be switched at any time when road conditions are suitable. The change may benefit users who don't like to move to another seat but want to face the opposite direction during a journey.

As aforementioned, after a check-in process is over, a vehicle's control system may ascertain a user's sitting orientation to decide which direction should be the forward direction and which side should be the front end. In some cases the control system may detect that there are multiple users sitting in a face-to-face configuration. Then the system may not be able to use sitting orientation to do it anymore. The dilemma may be overcome with a facial recognition method. It may be designed that after multiple users enter a vehicle, the users may be observed by a facial recognition system. The recognition system may recognize each user's identity or estimate the age of the users via facial features. Then the vehicle's control system may use age info to label a user, for instance, as child, adult, or senior citizen.

As used herein, word "child" may mean a minor, for instance, a person below the age of eighteen. Word "adult" may mean a young or middle-aged adult. "Adult" may include a senior citizen when senior citizen is not mentioned. Certain rules may be made based on the age info. For instance, when a child and an adult sit face to face, the control system may decide a front end based on the adult's sitting orientation. When an adult and a senior citizen are face to face, the senior citizen's position prevails and may be used for front end determination. The rule applies to child versus senior citizen scenario too. Thus, a decision may be made based on sitting orientation of a specific user. The decision, however, may be voided by a user's voice or gesture command. For instance, a user may submit voice and/or gesture instructions anytime to overwrite a decision made by the control system based on sitting orientation or other factors.

Furthermore, a vehicle's control system may monitor multiple users' voice and gestures at the same time. Any input detected may be analyzed to find out whether it contains any user command. When a user gives a voice and/or gesture command, the control system may obey the order and perform a task accordingly. But when there are multiple users, a control system may receive contradictory orders from different users consecutively. For instance, a user may say "Go this way" while pointing to a direction. However, another user may say "Go that way" and point to the opposite direction within, for instance, two to five seconds after the first user finishes speaking. When the control system receives the orders, it may not be able to figure out which one it should follow. Thus, certain rules may be designed. Like discussed, the control system may estimate each user's age using data obtained from a facial recognition system. The users may be categorized, like aforementioned, as child, adult, and senior citizen. When voice orders are received from a child and an adult or senior citizen respectively, the adult's or senior citizen's order prevails. In addition, when contradictory voice orders are from multiple adults or senior citizens, the order which is submitted last prevails. Similarly, when multiple orders are all from children, the last one prevails.

The age of a user may also be estimated roughly using a voice recognition system. Everyone has his or her unique voice. Voice may be analyzed to identify a user or estimate a user's age roughly. In applications mentioned herein, a user's voice may be ascertained to find out whether the user is a child. The method may be especially effective when a target user is a small child. It provides another way to categorize a user as child or adult when facial recognition means is not available. Rules about selecting a user's order after receiving multiple orders may apply not only to autonomous vehicles, but also smart voice-controlled devices like smart speakers or intelligent speakers. Autonomous vehicles and certain smart devices may employ the same method, since they are all configured to implement a task based upon voice and/or gesture input from users.

After an autonomous vehicle or a smart device receives a voice order from a user, it doesn't act immediately. Instead, it may wait for a given time, like two to five seconds. If no other user input is detected within the given time, an order receiving process is concluded and the order may be carried out. If another order is received within the given time, the vehicle or device may identify users involved using a facial and/or voice recognition system. The main goal is to recognize whether a user is a child. If it is detected that one order is issued by a child while the other by an adult, the adult's order may prevail and be implemented. If the orders are from two children or two adults, the second order may prevail. When there are more than two orders, the last order may prevail if the users are all children or all adults. When there are multiple orders coming from children and multiple orders from adults, the last adult order may prevail. In addition, when a child's order is implemented, certain restrictions may apply. For instance, some preselected actions or tasks may become off limits. As used herein, word "order" may mean a request to do a task which a vehicle or device is configured to handle.

Assume that a name "Speaker" is assigned to a smart speaker. "Speaker" is also designed as a wake word. When it is detected that a user says "Speaker", the speaker is arranged to treat voice and/or gesture input of the user or other users, which follows the wake word within a given time, as an order or orders it has to process. Assume that the speaker detects the following voice messages. User A said "Speaker, turn on TV". Then within a given time interval, user B said "No, don't turn on". Then within the given time interval after user B completes the sentence, user A said "Yes, please turn on". When the speaker is collecting the voice input, it also estimates the age of the users. If it is detected that user A is a child and user B is an adult, user B's order prevails and the speaker won't turn on the TV. If both are children or adults, the third or the last order prevails. The speaker may send a signal to turn on the TV. The example applies to an autonomous vehicle too.

Lastly, when a vehicle is parked beside a curb waiting for users, it may display signs to show that it is bi-directional. The signs may include two arrows pointing to opposite directions and an optional word "Bi-Directional". The vehicle may have a symmetric shape or asymmetric shape with an adjustable appearance. The signs may be helpful for some users who like to ride on a bi-directional vehicle.

Therefore the scope of the invention should be determined by the appended claims and their legal equivalents, rather than by the examples given.

The invention claimed is:

1. A method performed for operating a bi-directional autonomous vehicle, comprising:
   1) monitoring a user after the user gets in the autonomous vehicle using a plurality of sensors including a camera and a microphone by a control system, the autonomous vehicle including a plurality of ends, the control system including a processor;
   2) monitoring whether the user takes a seat by the control system;
   3) detecting which end of the plurality of ends the user faces after the user takes a seat using the camera by the control system;
   4) selecting one of the plurality of ends that the user faces after the user takes the seat as the autonomous vehicle's front end by the control system, the front end facing a forward driving direction of the autonomous vehicle; and
   5) starting driving the autonomous vehicle by the control system.

2. The method according to claim 1, further including selecting the autonomous vehicle's front end based on a direction mentioned in the user's voice command and/or a direction the user gestures at.

3. The method according to claim 1, further including selecting the autonomous vehicle's front end based on a direction which points to a destination location.

4. The method according to claim 1, further including changing an exterior shape of the autonomous vehicle when the autonomous vehicle's front end is changed from the one of the plurality of ends to another one of the plurality of ends.

5. The method according to claim 1, further including selecting the autonomous vehicle's front end based on preference information submitted by the user, the preference information comprising information about front end selection.

6. The method according to claim 1, further including selecting the autonomous vehicle's front end based on past records of the user, the past records comprising information about front end selection.

7. A method performed for operating a bi-directional autonomous vehicle, comprising:
   1) monitoring a user after the user gets in the autonomous vehicle using a plurality of sensors including a camera and a microphone by a control system, the autonomous vehicle including a plurality of ends, the control system including a processor;
   2) monitoring whether the user gives a voice command and/or a gesture instruction by the control system;
   3) collecting and analyzing the user's voice command and/or gesture instruction;
   4) selecting one of the plurality of ends as the autonomous vehicle's front end by the control system when the user gestures at a direction pointing to the one of the plurality of ends or issues the voice command and gestures at a direction pointing to the one of the plurality of ends, the front end facing a forward driving direction of the autonomous vehicle; and
   5) starting driving the autonomous vehicle by the control system.

8. The method according to claim 7, further including selecting the autonomous vehicle's front end based on a direction the user faces.

9. The method according to claim 7, further including selecting the autonomous vehicle's front end based on a direction which points to a destination location.

10. The method according to claim 7, further including changing an exterior shape of the autonomous vehicle when the autonomous vehicle's front end is changed from the one of the plurality of ends to another one of the plurality of ends.

11. The method according to claim 7, further including selecting the autonomous vehicle's front end based on preference information obtained from the user, the preference information comprising information about front end selection.

12. The method according to claim 7, further including selecting the autonomous vehicle's front end based on past records of the user, the past records comprising information about front end selection.

13. A method performed for operating a bi-directional autonomous vehicle, comprising:
   1) monitoring a user after the user gets in the autonomous vehicle using a plurality of sensors including a camera and a microphone by a control system, the autonomous vehicle including a plurality of ends, the control system including a processor;
   2) obtaining the user's identity information and sending the user's identity information to a remote facility via the control system;
   3) receiving preference information on the user from the remote facility, wherein the preference information includes the user's preference on selecting one of the plurality of ends as the autonomous vehicle's front end, the front end facing a forward driving direction of the autonomous vehicle;
   4) selecting one of the plurality of ends as the autonomous vehicle's front end based on the preference information and a direction the user faces by the control system; and
   5) starting driving the autonomous vehicle by the control system.

14. The method according to claim 13 wherein the preference information is prearranged by the user.

15. The method according to claim 13, further including selecting the autonomous vehicle's front end based on a direction mentioned in the user's voice command.

16. The method according to claim 13, further including changing an exterior shape of the autonomous vehicle when the autonomous vehicle's front end is changed from the one of the plurality of ends to another one of the plurality of ends.

17. The method according to claim 13, further including selecting the autonomous vehicle's front end based on a direction the user gestures at or the user faces.

* * * * *